United States Patent [19]
Arai et al.

[11] Patent Number: 5,247,444
[45] Date of Patent: Sep. 21, 1993

[54] VEHICLE CONTROL SYSTEM

[75] Inventors: Kenji Arai; Kazumasa Kurihara, both of Saitama, Japan

[73] Assignee: Zexel Corporation, Tokyo, Japan

[21] Appl. No.: 754,666

[22] Filed: Sep. 4, 1991

[30] Foreign Application Priority Data

Sep. 7, 1990 [JP] Japan ................... 2-235605

[51] Int. Cl.⁵ .................. G06F 15/48; G06F 7/70; G01M 15/00
[52] U.S. Cl. .................. 364/431.05; 364/424.05; 364/424.01; 73/119 A
[58] Field of Search ............ 364/184, 187, 131, 424.1, 364/424.05, 431.05; 123/357, 438, 448, 589; 74/866–868

[56] References Cited
U.S. PATENT DOCUMENTS

| | | | |
|---|---|---|---|
| 4,395,905 | 8/1983 | Fujimori et al. | 123/479 |
| 4,450,812 | 5/1984 | Otsuka et al. | 123/479 |
| 4,492,196 | 1/1985 | Oshizawa | 123/479 |
| 4,619,234 | 10/1986 | Okamoto | 364/431.05 |
| 4,882,669 | 11/1989 | Miura et al. | 364/187 |
| 5,032,997 | 7/1991 | Kawagoe | 364/414.05 |
| 5,153,835 | 10/1992 | Hashimoto et al. | 364/431.11 |

FOREIGN PATENT DOCUMENTS
3641243A1 12/1988 Fed. Rep. of Germany.

*Primary Examiner*—Thomas G. Black
*Assistant Examiner*—J. H. Louis-Jacques

[57] ABSTRACT

A vehicle control system includes a sensor for detecting an operating condition of a vehicle, and a control device. When the output of the sensor is normal, the control device controls an actuator in accordance with the output of the sensor. When the output of the sensor exceeds a limit value and therefore becomes abnormal, the control device controls the actuator using backup data. As the backup data, auxiliary backup data is first used, and thereafter predetermined main backup data is used. The auxiliary backup data gradually varies from a value of the output of said sensor, obtained immediately before the output of the sensor exceeds the limit value, toward the main backup data, so that the auxiliary back data becomes closer to the main backup data.

7 Claims, 3 Drawing Sheets

VEHICLE CONTROL SYSTEM

BACKGROUND OF THE INVENTION

This invention relates generally to a vehicle control system, and more particularly to such a system in which if a sensor for detecting an operating condition of the vehicle is subjected to a malfunction, an actuator is controlled using backup data, instead of using the output of this sensor.

U.S. Pat. No. 4,450,812 (corresponding to Japanese Patent Publication No. 90/999/88) discloses a vehicle control system in which in the event of a malfunction of a sensor, backup data can be used. More specifically, this conventional control system comprises the sensor for detecting the condition of an engine, control means for controlling an actuator (here, a pulse motor for operating a fuel-air ratio control valve) in accordance with the output of the sensor so as to control the amount of supply of fuel to the engine, first judgment means for judging whether or not the output of the sensor is an abnormal value outside a predetermined normal range between upper and lower limit values, second judgment means for judging whether or not the abnormal output of the sensor determined by the first judgment means is lasting for a predetermined period of time, and backup data supply means. As shown in FIG. 5, when the first judgment means judges that the output V' of the sensor is an abnormal value above the upper limit value $R_U'$ or below the lower limit value $R_L'$ the backup data supply means supplies a value of the sensor output V', obtained immediately before this abnormal value, as backup data Y' to the control means. When the result of judgment of the second judgment means is "YES" (that is, the sensor output V' continues to be a normal for the predetermined period of time), the control means brings the engine into an idling condition, so that the vehicle can be guided to a safe side.

In the above conventional control system, when the sensor output V' goes outside the normal range due to noises, and then is returned to a normal value before the above predetermined period of time elapses, the sensor output V' is again used instead of the backup data Y' to thereby recover the normal control condition.

In the above conventional control system, however, as shown in FIG. 5, there are occasions when the backup data Y' is close to the upper limit value $R_U'$. In this case, upon lapse of the above predetermined period of time, that is, when the control means is switched from the control based on the backup data Y' to the idling control, the operating condition of the vehicle is abruptly changed, which is undesirable. Also, when the control means controls the actuator in accordance with the backup data Y' close to the upper limit value $R_U'$, the amount of supply of the fuel is increased to an almost maximum against the will of the driver, so that the engine speed is kept high for a predetermined time period, which is also undesirable.

SUMMARY OF THE INVENTION

It is an object of this invention to provide a vehicle control system which can prevent an abrupt change of an operating condition of the vehicle, and overcomes the disadvantage that backup data close to a limit value is continuously used for a predetermined time period.

According to the present invention, there is provided a vehicle control system comprising:

(a) a sensor for detecting an operating condition of a vehicle;

(b) control means for controlling an actuator in accordance with an output of the sensor, the actuator controlling the operation of the vehicle;

(c) judgment means for judging whether or not the output of the sensor exceeds a predetermined limit value and therefore is abnormal; and (d) backup data supply means for supplying backup data, instead of the output of the sensor, to the control means when the judgment means judges that the output of the sensor is abnormal, the back data supply means comprising auxiliary backup data supply means for transiently supplying auxiliary backup data immediately after the judgment means judges that the output of the sensor is abnormal, and main backup data supply means for continuously supplying predetermined main backup data after the auxiliary backup data is supplied, and the auxiliary backup data supplied by the auxiliary backup data supply means gradually varying from a value of the output of the sensor, obtained immediately before the output exceeds the limit value, toward the main backup data, so that the auxiliary back data becomes closer to the main backup data.

DESCRIPTION OF THE PREFERRED EMBODIMENT

Figure 1:
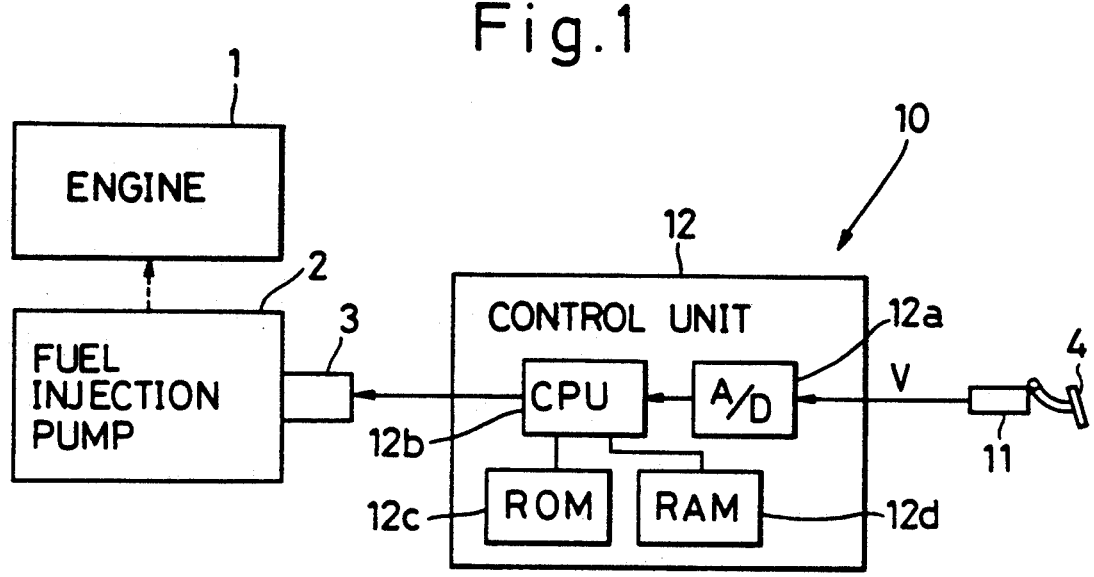
FIG. 1 is a schematic view of a vehicle control system according to the present invention.

One preferred embodiment of the present invention will now be described with reference to FIGS. 1 to 4. As shown in FIG. 1, a vehicle includes a diesel engine 1, a fuel injection pump 2 for supplying fuel to the diesel engine 1, an accelerator pedal 4, and a control system 10. The fuel injection pump 2 includes a linear motor (actuator) 3 for controlling the amount of injection of the fuel.

The control system 10 comprises a potentiometer (accelerator sensor) 11 for detecting the amount of pressing-down or degree of depression of the accelerator pedal 4, a rotation sensor (not shown) for detecting the speed of rotation of the engine 1, a water temperature sensor (not shown) for detecting the temperature of cooling water for the engine 1, and so on. The control system 10 also includes a control unit 12 which controls the actuator 3 in accordance with an output V of the accelerator sensor 11, an output of the rotation sensor and an output of the water temperature sensor. The control unit 12 includes an analog-to-digital converter (A/D converter) 12a for converting the output V of the accelerator sensor 11 and other outputs into digital data, a microprocessor (CPU) 12b for processing the data from the A/D converter 12a so as to control the actuator 3, a read-only memory (ROM) 12c storing a program to be executed by the microprocessor 12b, upper and lower limit values (later described), main backup data, a constant α, and etc., and a random access memory (RAM) 12d.

The operation of the microprocessor 12b will now be briefly described with reference to FIG. 4. It is judged whether or not the output V of the accelerator sensor 11 is within a normal range between an upper limit value $R_U$ and to a lower limit value $R_L$. Here, the upper limit value $R_U$ is slightly larger than the value of the output V of the accelerator sensor 11 corresponding to the maximum amount of pressing-down or degree of depression of the acceleration pedal 4. The lower limit value $R_L$ is slightly smaller than the value of the output V of the accelerator sensor 11 corresponding to no pressing-down or a zero degree of depression of the accelerator pedal 4 keeping the engine 1 in an idling condition. The main backup data X (later described) is larger than the lower limit value $R_L$, and is slightly larger than the value of the output V of the accelerator sensor 11 corresponding to no pressing-down or a zero degree of depression of the accelerator pedal 4.

When the output V of the accelerator sensor 11 is within the normal range between the upper limit value $R_U$ and the lower limit value $R_L$, the microprocessor 12b controls the actuator 3 in accordance with the output V of the accelerator sensor 11. This is a normal control condition.

Figure 4:
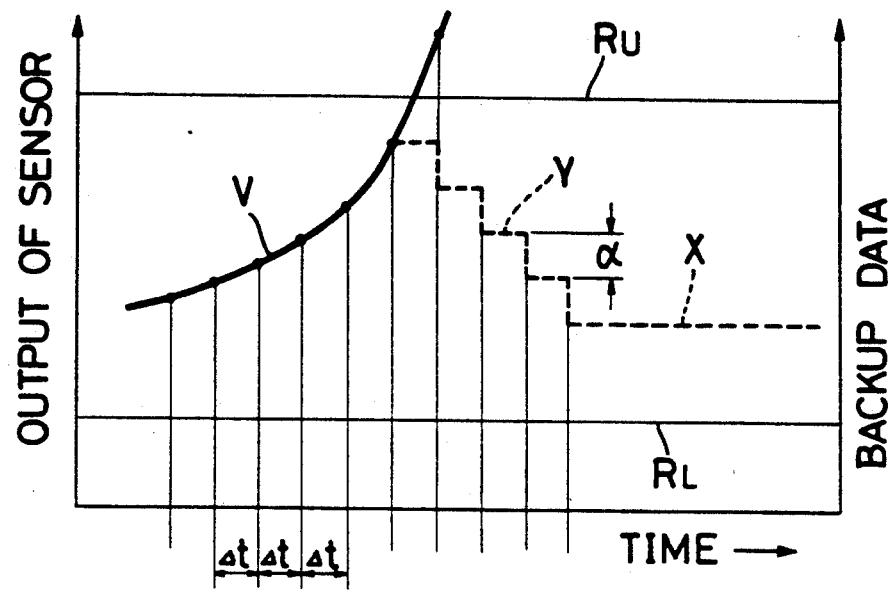
FIG. 4 is a diagrammatical illustration showing an output of a sensor and backup data used in the control system of the invention.
Figure 5:
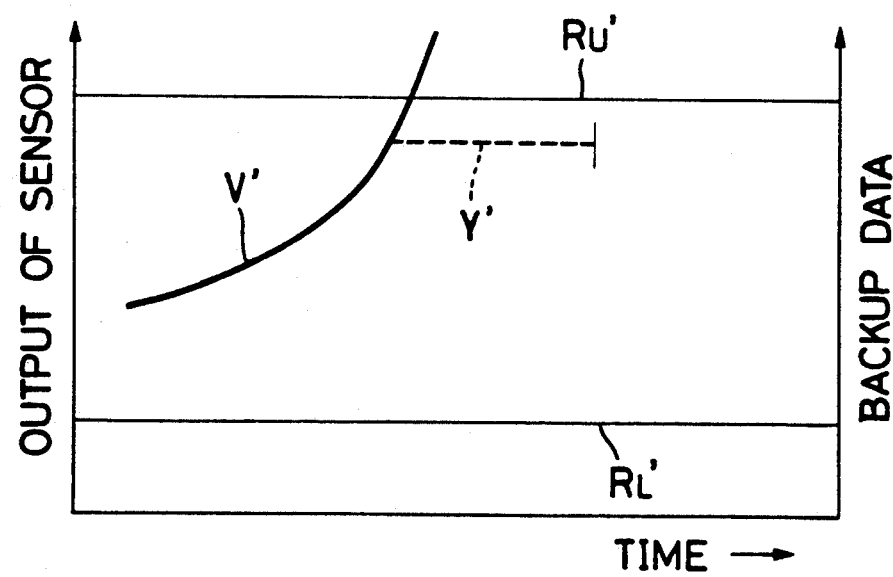
FIG. 5 is a diagrammatical illustration showing an output of a sensor and backup data used in the conventional control system.

As shown in FIG. 4, when the output V of the accelerator sensor 11 is outside the normal range between the upper limit value $R_U$ and the lower limit value $R_L$, the microprocessor 12b controls the actuator 3 in accordance with backup data. As the backup data, auxiliary backup data Y is first used transiently. The auxiliary backup data Y varies the constant α per period Δt toward the main backup data X from the value of the output V of the accelerator sensor 11 obtained immediately before the output V goes above the upper limit value $R_U$ or goes below the lower limit value $R_L$. For example, as shown in FIG. 4, when the output V of the accelerator sensor 11 exceeds the upper limit value $R_U$, the auxiliary backup data Y decreases the constant α per period Δt from the value of the output V of the accelerator sensor 11 obtained immediately before the output V goes above the upper limit value $R_U$, so that the auxiliary backup data Y substantially coincides with the main backup data X. Thereafter, the main backup data X is continuously used. When the sensor output V is returned to within the normal range between the upper limit value $R_U$ and the lower limit value $R_L$, this sensor output V is used for controlling the actuator 3. For better understanding of the illustration of FIG. 4, the period Δt and the constant α are shown in an exaggerated manner.

As described above, when the output V of the accelerator sensor 11 goes above the upper limit value $R_U$ or goes below the lower limit value $R_L$, the auxiliary backup data Y gradually varies from the value of the output V of the accelerator sensor 11 obtained immediately before the output V goes above the upper limit value $R_U$ or goes below the lower limit value $R_L$, so that the auxiliary backup data Y goes close to the main backup data X. Therefore, an abrupt change of the operating condition of the vehicle can be prevented. The auxiliary backup data Y is not maintained at the value of the output V obtained immediately before the output V exceeds the upper limit value $R_U$, but decreases gradually. Therefore, even if the value of the output V, obtained immediately before the output V exceeds the upper limit value $R_U$, is close to the upper limit value $R_U$, the amount of the fuel injection is prevented from increasing against the will of driver, so that the speed of the vehicle can be lowered gradually. Also, when the accelerator sensor 11 is subjected to a malfunction, so that the output V continues to be above the upper limit value $R_U$ or below the lower limit value $R_L$, the auxiliary back up data Y is brought into agreement with the main backup data X, and thereafter the actuator 3 is controlled in accordance with the main backup data X. Since the main backup data X is set to the value slightly larger than the lower limit value $R_L$, the fuel supply amount is controlled to such a level as needed for running the vehicle at low speeds, and therefore the vehicle can be moved to a safe place.

Next, the data processing program executed by the microprocessor 12b will be described in detail with reference to FIG. 2. This program is executed periodically, that is, at intervals of a period Δt. Reference is first made to flags used in this program. A flag FLG(U) indicates the fact that the sensor output V exceeds the upper limit value $R_U$. A flag FLG(K) indicates the fact that the sensor output V detected is abnormal and the fact that the auxiliary backup data Y is being supplied at present. A flag FLG(E) indicates the fact that the sensor output V detected is abnormal and the fact that the main backup data X is being supplied at present. A register A temporarily stores the sensor output V, and a register B stores basic data for the control.

Figure 2:
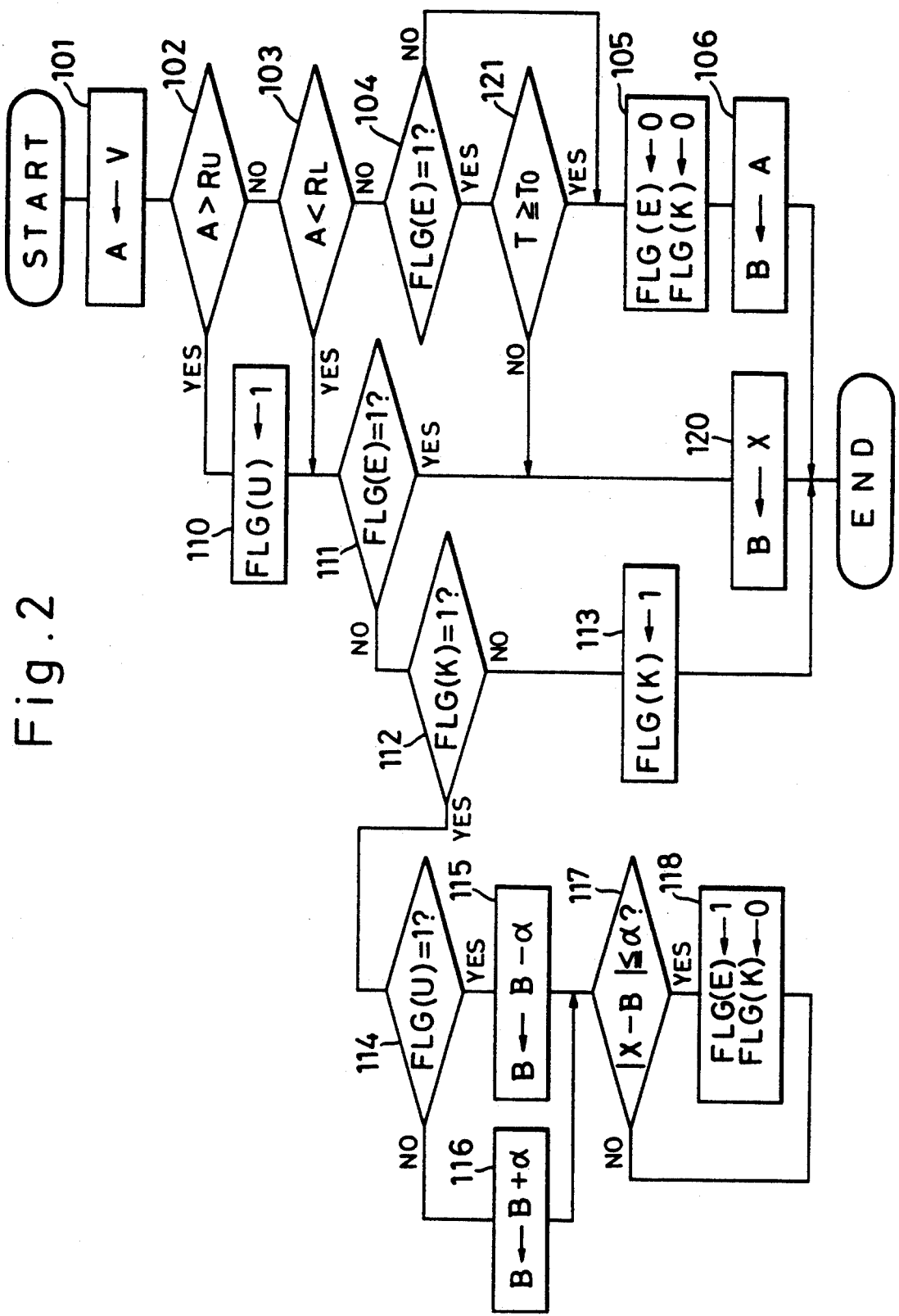
FIG. 2 is a flow chart of a data processing program periodically repeated by a microprocessor.

In the program of FIG. 2, first, the output V of the accelerator sensor 11 is written on the register A (Step 101). Then, it is judged whether or not the data in the register A (that is, the output V of the accelerator sensor 11) is higher than the upper limit value $R_U$ (Step 102). If the result of judgment of Step 102 is "NO", it is judged whether or not the output V of the accelerator sensor 11 is lower than the lower limit value $R_L$ (Step 103).

If the result of judgment of Step 103 is "NO" (that is, it has been judged that the sensor output V is in the normal range between the upper limit value $R_U$ and the lower limit value $R_L$), it is judged whether or not the flag FLG(E) has been set (Step 104). If the output V of the accelerator sensor 11 has been kept in the normal condition, the result of judgment of this Step 104 is, of course, "NO".

If the judgment result of Step 104 is "NO", the flags FLG(E) and FLG(K) are reset (Step 105), and the data in the register A is written onto the register B (Step 106). If the accelerator sensor 11 is normal, this procedure from Steps 101 to Step 106 is repeated, and the output V of the accelerator sensor 11 is always stored in the register B.

Figure 3:
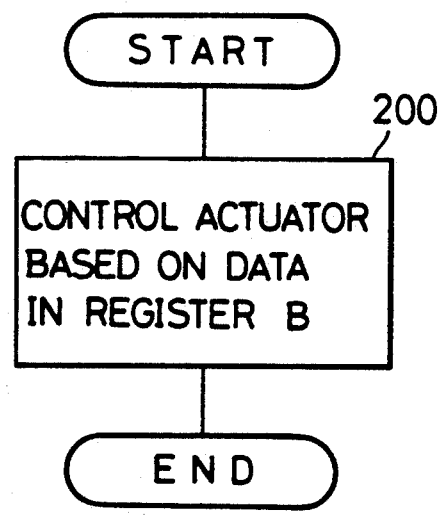
FIG. 3 is a flow chart of a control program based on data obtained by the program of FIG. 2.

As shown in FIG. 3, in the control program executed by the microprocessor 12b, the actuator 3 is controlled in accordance with the data (which represent the amount of pressing-down or degree of depression of the accelerator pedal 4) stored in the register Band data from other sensors (Step 200). Therefore, if the output V of the accelerator sensor 11 is normal as described above, the control of the actuator 3 is carried out in accordance with the output V of the accelerator sensor 11.

If the judgment result of Step 102 is "YES", the flag FLG(U) is set (Step 110), and then the program proceeds to Step 111. Also, if the judgment result of Step 103 is "YES", the program proceeds directly to Step 111, skipping over Step 110.

In Step 111, it is judged whether or not the flag FLG(E) has been set. If the judgment result of Step 111 is "NO", it is judged whether or not the flag FLG(K) has been set (Step 112). If the judgment result of Step 112 is "NO" (that is, it is judged that the sensor output V is abnormal at this cycle for the first time), the flag FLG(K) is set (STEP 113), and this program a finished. Therefore, the sensor output V, written on to the register A at this cycle of the program, is not written onto the register B, and the sensor output V, written onto the register B at the preceding cycle of the program (that is, the sensor output V immediately before it becomes abnormal), remains stored there. Therefore, in the control program of FIG. 3 executed immediately after this data processing program, this sensor output V is used as the auxiliary backup data.

If the judgment result of Step 112 is "YES" (that is, the abnormality of the sensor output V is detected not less than twice, and it is judged that the auxiliary backup data is in the process of being supplied), it is judged whether or not the flag FLG(U) has been set (Step 114). If the result of judgment of Step 114 is "YES" (that is, it is judged that the abnormality of the output V of the accelerator sensor 11 is due to its value exceeding the upper limit value $R_U$), the constant $\alpha$ is subtracted from the data stored in the register B, and the value thus obtained is written onto the register B (Step 115). If the judgment result of Step 114 is "NO" (that is, it is judged that the abnormality of the output V of the accelerator sensor 11 is due to its value going below the lower limit value $R_L$), the constant $\alpha$ is added to the data stored in the register B, and the value thus obtained is written onto the register B (Step 116). Therefore, each time the program is executed at the intervals of the period $\Delta t$, the data in the register B serving as the auxiliary backup data becomes closer to the main backup data X.

Then, it is judged whether or not the difference between the data (the auxiliary backup data) in the register B and the main backup data is equal to or less than the constant $\alpha$ (Step 117). If the result of judgment of Step 117 is "NO", the program is finished. If the judgment result of Step 117 is "Yes" (that is, it is judged that the auxiliary backup data in the register B substantially coincides with the main backup data X), the flag FLG(E) is set, and the flag FLG(K) is reset (Step 118). By doing so, the supply of the auxiliary backup data is finished. Namely, in the program to be subsequently executed, the judgment result of Step 111 is "YES", and the main backup data X is written onto the register B (Step 120), and the control of the actuator 3 based on this main backup data is continuously carried out.

Next, reference is now made to the case where the output V of the accelerator sensor 11 is returned from the abnormal condition to the normal condition. When the output V of the accelerator sensor 11 is returned to the normal condition during the supply of the auxiliary backup data, that is, in the set condition of the flag FLG(K), the judgment results of Steps 102, 103 and 104 are "NO", and therefore Steps 105 and 106 are executed, so that the output V of the accelerator sensor 11 is immediately used for controlling the actuator 3. When the output V of the accelerator sensor 11 is returned to the normal condition during the supply of the main backup data X, that is, in the set condition of the flag FLG(E), the judgments of Steps 102 and 103 are made in the negative, and then the judgment of Step 104 is made in the affirmative, and then the program proceeds to Step 121. In this Step 121, it is judged whether or not a time period T, elapsed after the output V of the accelerator sensor 11 is returned to within the normal range, reaches a predetermined time period To. This lapse time T is measured by a timer incorporated in the control unit 12, and this timer begins to measure the time when the first affirmative judgment of Step 104 follows after the negative judgments of Steps 102 and 103. This time measuring is stopped when the judgment of Step 121 becomes affirmative.

If the judgment result of Step 121 is "NO", the main backup data X is written onto the register B in Step 120, and the program is finished. Therefore, the control of the actuator 3 based on the main backup data X is continued. This is done in view of the possibility that the output V of the accelerator sensor 11 is accidentally returned to the normal condition.

If the judgment results of Step 121 is "YES" (that is, it is judged that the output of the accelerator sensor 11 is returned to the normal output without any doubt), the program proceeds to the above-mentioned Step 105 in which the flags FLG(E) and FLG(K) are reset, and then the program further proceeds to Step 106 in which the data in the register A is written on the register B. By doing so, the control of the actuator 3 based on the output V of the accelerator sensor 11 is carried out.

The present invention is not limited to the above embodiment, and suitable modifications can be made without departing from the scope of the invention. For example, Step 120 in the above embodiment may be omitted, in which case if the judgment result of Step 111 is "YES", or if the judgment result of Step 121 is "NO" the program is finished.

There can be used backup data related to the rotation sensor for detecting the rotation speed of the engine, a vehicle speed sensor for detecting the speed of an output shaft of a gear box, the water temperature sensor for detecting the temperature of the cooling water for the engine, or any other sensor for detecting a condition related to the operation of the vehicle.

If the safety zone is at the side of the upper limit value, the main backup data can be set to a value slightly lower than the upper limit value. For example, if the backup data related to the water temperature sensor is used, the main backup data is slightly lower than the upper limit value.

In the above embodiment, although the auxiliary backup data is calculated by the addition or the subtraction of the constant $\alpha$, the auxiliary backup data may be calculated according to a predetermined map, using the lapse time as an address. Further, the auxiliary backup data may be varied in accordance with a variable proportional to the difference between the auxiliary backup data and the main backup data.

What is claimed is:

1. A vehicle control system comprising:
   (a) an accelerator sensor for detecting the degree of depression of an accelerator pedal;
   (b) control means for controlling an actuator in accordance with an output of said accelerator sensor, said actuator controlling the amount of fuel injected into an engine;
   (c) judgment means for judging whether or not the output of said accelerator sensor exceeds a predetermined upper limit value and therefore abnormal, said upper limit value is a value of the output of said accelerator sensor which corresponds to the maximum degree of depression of said accelerator pedal;

(d) auxiliary backup data supply means for transiently supplying auxiliary backup data, instead of the output of said accelerator sensor, to said control means, immediately after said judgment means judges that the output of said accelerator sensor is abnormal, wherein said auxiliary backup data gradually varies from the value of the output of said accelerator sensor obtained immediately before said output exceeded said upper limit value toward a predetermined main backup data, so that said auxiliary backup data becomes closer to said main backup data; and (e) main backup data supply means for continuously supplying said main backup data, instead of the output of said accelerator sensor, to said control means after said auxiliary backup data is supplied, wherein said main backup data represents the value that corresponds to a low level of fuel injected in order to bring a vehicle to a safe operating condition.

2. A vehicle control system according to claim 1, in which said main backup data is equal to a value of the output of said accelerator sensor corresponding to a small degree of depression of said accelerator pedal as needed for running the vehicle at low speeds.

3. A vehicle control system according to claim 1, in which said judgment means compares the output of said accelerator sensor with said upper limit value and a lower limit value, and judges that the output of said accelerator sensor is abnormal when the output of said accelerator sensor exceeds either of said upper and lower limit values, said lower limit value being smaller than a value of the output of said accelerator sensor corresponding to no depression of said accelerator pedal.

4. A vehicle control system according to claim 1, further comprising switch means for again supplying the output of said accelerator sensor to said control means when said judgment means judges during the supply of said auxiliary backup data that the output of said accelerator sensor is returned to a normal output.

5. A vehicle control system according to claim 1, further comprising switch means for again supplying the output of said accelerator sensor to said control means when said judgment means judges during the supply of said main backup data that the output of said accelerator sensor is returned to a normal output.

6. A vehicle control system according to claim 5, in which said switch means begins to supply the output of said accelerator sensor to said control means upon lapse of a predetermined time period after the output of said accelerator sensor is returned to said normal output.

7. A vehicle control system according to claim 1, in which said auxiliary backup data supply means periodically varies said auxiliary backup data by a predetermined amount so as to bring said auxiliary backup data closer to said main backup data, and stops to supply said auxiliary backup data when the difference between said auxiliary backup data and said main backup data becomes smaller than said predetermined amount.

* * * * *